US005569152A

United States Patent [19]

Smith

[11] Patent Number: 5,569,152
[45] Date of Patent: Oct. 29, 1996

[54] BUFFERING OF CEMENTITIOUS HAZARDOUS WASTE COMPOSITIONS CONTAINING ELECTRIC ARC FURNACE DUST

[75] Inventor: Charles L. Smith, Conshohocken, Pa.

[73] Assignee: Conversion Systems, Inc., Horsham, Pa.

[21] Appl. No.: 360,281

[22] Filed: Dec. 21, 1994

[51] Int. Cl.$^6$ ............................ A62D 3/00; B09B 3/00; C04B 7/28
[52] U.S. Cl. .................... 588/256; 106/791; 210/751; 588/252; 588/901
[58] Field of Search .................................. 588/249, 252, 588/256, 257, 901; 75/746, 773; 106/790, 791; 210/751

[56] References Cited

U.S. PATENT DOCUMENTS

| | | |
|---|---|---|
| H283 | 6/1987 | Myers et al. ............................ 210/751 |
| Re. 29,783 | 9/1978 | Smith et al. . |
| 3,645,719 | 2/1972 | Minnick . |
| 3,785,840 | 1/1974 | Minnick et al. ............... 106/DIG. 1 X |
| 3,870,535 | 3/1975 | Minnick et al. . |
| 4,137,166 | 1/1979 | Heimberger et al. . |
| 4,344,796 | 8/1982 | Minnick ..................... 106/DIG. 1 X |
| 4,432,666 | 2/1984 | Frey et al. ............................ 588/257 |
| 4,514,307 | 4/1985 | Chestnut et al. .................... 588/256 X |
| 4,822,379 | 4/1989 | Thompson . |
| 4,840,671 | 6/1989 | Lynn et al. ............................ 210/911 X |
| 4,889,640 | 12/1989 | Stanforth ................................ 210/751 |
| 4,909,844 | 3/1990 | Thompson . |
| 5,013,532 | 5/1991 | Sresty . |
| 5,037,479 | 8/1991 | Stanforth ............................ 588/257 X |
| 5,130,051 | 7/1992 | Falk ..................................... 210/751 X |
| 5,186,742 | 2/1993 | Hoffman et al. . |
| 5,198,190 | 3/1993 | Philipp et al. . |
| 5,202,033 | 4/1993 | Stanforth et al. .................... 588/256 X |
| 5,245,122 | 9/1993 | Smith .................................... 588/257 |
| 5,252,127 | 10/1993 | Pichat ................................. 588/252 X |

OTHER PUBLICATIONS

"Methods to Treat EP Toxic Foundry Wastes and Wastewaters" by P. D. Turpin, T. R. Stolzenburg, W. A. Stephens, and T. P. Kunes. *AFS Transactions*, pp. 737–740 (undated).

"Treatment of Plating Wastewaters by Ferrous Reduction, Sulfide Precipitation, Coagulation and Upflow Filtration" by T. E. Higgins and S. G. TerMaath. *Proceedings of the 36th Industrial Waste Conference*, May 12, 13 and 14, 1981, Purdue University, Lafayette, Indiana. Section 11, pp. 462–471.

"Unit Operations for Treatment of Hazardous Industrial Wastes" by J. B. Berkowitz, J. T. Funkhouser and J. I. Stevens, Arthur D. Little, Inc. Prepared for publication by D. J. De Renzo, Noyes Data Corporation, Park Ridge, New Jersey, U.S.A., 1978. pp. 810–815.

"Chemical Fixation and Solidification of Hazardous Wastes" by J. R. Conner, Chemical Waste Management, Inc. Van Nostrand Reinhold, New York, 1990. pp. 76–80.

"Chemical Treatment of Sewage and Industrial Wastes" by Dr. W. A. Parsons, Virginia Polytechnic Institute, Blacksburg, VA. Published by National Lime Association, Washington, D. C., 1965. pp. 28–30, 37–38.

*Primary Examiner*—George A. Suchfield
*Attorney, Agent, or Firm*—Ratner & Prestia

[57] ABSTRACT

A buffering agent for a cementitious hazardous waste composition, containing electric arc furnace dust (EAFD) and water, includes dolomitic lime, namely either dolomitic quicklime, dolomitic monohydrated lime or dolomitic dihydrated lime. Dolomitic lime serves as a buffering agent for the hazardous waste composition by maintaining the pH of the waste composition within a target range over which solubility of several heavy metals tends to be minimized. These heavy metals include lead, zinc and cadmium, among others, and the pH range within which the heavy metals experience a minimum solubility is approximately 8.5 to 11.5, and preferably 9.4 to 10.2. In addition, dolomitic lime is substantially insoluble in water, so that the buffering agent will not leach or diffuse out of the waste composition.

28 Claims, 7 Drawing Sheets

BUFFERING OF CEMENTITIOUS HAZARDOUS WASTE COMPOSITIONS CONTAINING ELECTRIC ARC FURNACE DUST

FIELD OF THE INVENTION

The present invention pertains to buffering agents for maintaining the pH of a hazardous waste composition, containing water and electric arc furnace dust (EAFD), over a pH range which minimizes the solubility of heavy metals.

BACKGROUND OF THE INVENTION

There are relatively few effective, environmentally acceptable options for disposal of hazardous waste compositions and more particularly hazardous waste compositions containing electric arc furnace dust (EAFD). Recycling is clearly the most desirable "disposal" option for any waste, but this option is extremely limited for hazardous waste. Incineration of waste is highly desirable if the wastes are combustible and even more so if wastes are in sufficient quantities that by-product energy from the combustion can be captured. Incineration typically yields some non-combustible residue.

The ultimate disposal method for nearly all waste residues is in or on the surface of the earth by way of landfilling. Focusing specifically on hazardous wastes, these wastes must be isolated from the environment, through treatment or fixation/stabilization or both, to eliminate or minimize any future environmental impact. For hazardous wastes which are placed in landfills, a highly desirable option is fixation/stabilization, in which wastes are converted to a monolithic mass having good structural integrity, a low permeability coefficient and reduced leachate potential.

U.S. Pat. No. 5,245,122, entitled METHOD AND MIXTURE FOR TREATING ELECTRIC ARC FURNACE DUST, discloses a method for chemically stabilizing a hazardous waste composition containing EAFD by using the pozzolanic characteristics of EAFD. This method involves forming a mixture of EAFD with water and lime and, optionally, ferrous sulfate. The freshly blended product has acceptable leachate concentrations. The method disclosed in the '122 patent minimizes the concentration of certain heavy metals in the leachate from the freshly blended product.

The concentration of certain heavy metals in the leachate is of specific significance because the Environmental Protection Agency (EPA) demands that hazardous waste disposal compositions do not release heavy metals even after exposure to acid rainfall. Acidic rainfall is known to be prevalent throughout much of the United States, partly due to man-made air pollution such as sulfur and nitrogen oxides from combustion and fossil fuels, and partly due to the inclusion of atmospheric carbon dioxide in precipitation. The EPA has established specific test protocols, which the fixated/stabilized waste materials must pass if the processing is to be considered environmentally suitable. These test protocols relate to the effect of acidic rainfall on landfill disposed waste.

In particular, all three of the tests that have been developed by the EPA are predicated upon exposing the landfill compositions to acid, followed by an analysis of the fluids generated from that test with respect to the toxic metals content.

In particular, EPA SW-846 TEST METHODS FOR EVALUATING SOLID WASTE: PHYSICAL/CHEMICAL METHODS, Third Edition, contains:

(1) Method 1310-EXTRACTIVE PROCEDURE TOXICITY TEST (EPTT) METHOD;
(2) Method 1311-TOXICITY CHARACTERISTIC LEACHING PROCEDURE (TCLP); and
(3) Method 1320-MULTIPLE EXTRACTION PROCEDURE.

The EPTT method involves exposing the material to be tested to an acetic acid solution, which has been deemed equivalent to acid rainfall exposure. The EPTT method has been superseded by the TCLP, which is a more rigorous acetic acid procedure. The multiple extraction procedure is a method of evaluating long term acid rainfall by exposure to a combination of nitric and sulfuric acids in nine sequential tests.

The effect of acidity on a fixated/stabilized mass is to lower pH levels within the mass. This tends to allow many heavy metals (e.g., lead, nickel, chromium) to be re-solubilized in water. Indeed, many of the heavy metals tend to achieve minimum solubility within a fairly tight pH range, that is they re-solubilize at pH levels below or, in some cases, above that range. This pH range, over which heavy metals experience minimum solubility, varies depending on the metal and on the source of the waste composition. Of course, if permitted to solubilize, the heavy metals tend to leach out of the fixated/stabilized mass, to the detriment of the environment.

Although typical fixated/stabilized compositions, such as compositions containing lime, Portland cement or class "C" fly ash, are alkaline in nature, acid rain or acid rain simulating tests can overcome this alkalinity. One approach to avoid the decrease in pH resulting from exposure to acid rain would be to place additional quantities of an alkaline agent, such as lime or limestone, into the waste compositions. If such an alkaline agent were added, however, the pH level in the composition would tend to be shifted up or down, toward a pH value of 8 if the agent is limestone or toward a pH value of 12 if the agent is lime. Both of these values are outside of the target pH range for minimizing the solubility of heavy metals. Therefore, the simple inclusion of alkaline agents such as lime or limestone does not aid in preventing heavy metals from solubilizing.

Thus, there is a need for a buffering agent which is capable of maintaining a hazardous waste composition within a pH range over which heavy metal solubility tends to be minimized.

Furthermore, it would be advantageous for this buffering agent to be capable of maintaining this pH range over a relatively wide range of lime content in the waste, which otherwise affects the pH of the waste composition. There are several reasons for a variation in the lime content. For example, the waste composition might not be completely well mixed which would cause areas of high and low concentration of lime. Also, with respect to EAFD wastes, the concentration of lime varies depending on the source of the waste. Also, the available calcium oxide content of EAFD from some sources tends to vary widely with time. In addition, it might be difficult to precisely proportion the various components of the composition, such as ferrous sulfate and lime. The buffering agent should preferably be available as a fine, dry material for ease of proportioning and mixing.

Finally, although buffers are commonly known as soluble materials, a buffering agent for use in the present invention should be essentially insoluble in water. Soluble buffers in fixation/stabilization systems would rapidly dilute or leach away from the mass upon rainfall, thereby rendering such buffering agents useless to maintain the desired pH range for such systems.

SUMMARY OF THE INVENTION

In order to satisfy these and other needs, the present invention provides a buffering agent for a hazardous waste composition including water and EAFD. The buffering agent is dolomitic lime, such as dolomitic quicklime, dolomitic monohydrated lime or dolomitic dihydrated lime. This buffering agent maintains the hazardous waste composition, during acid exposure, within a pH range which minimizes heavy metal ion solubility in water.

The present invention also includes the buffered hazardous waste composition including EAFD, sufficient water to react with the EAFD, and dolomitic lime in an amount sufficient to: (a) achieve a magnesium oxide equivalents concentration in the waste composition of at least 0.5%, measured on a wet weight basis and (b) maintain the waste composition, during and after acid exposure, within a pH range of 8.5–11.5, which reduces heavy metal ion solubility in water due to acid exposure. Preferably, the buffered hazardous waste composition of the present invention maintains a pH range of 9.4 to 10.2 during and after acid exposure.

The present invention is also directed to a method of treating a hazardous waste composition, containing EAFD and water, to reduce heavy metal ion solubility in water. The method of the present invention provides for adding a neutralizing agent to the waste composition, if total available lime concentration in said waste composition exceeds 4.0% (optionally 2.0%), measured on a wet weight basis (i.e., weight percent including water). The neutralizing agent should be added in an amount sufficient to reduce the total available lime concentration to 4.0% (optionally 2.0%), measured on a wet weight basis. With or without the preliminary neutralization step, the method of the present invention then comprises adding dolomitic lime to the waste composition in an amount sufficient to achieve a magnesium oxide equivalents concentration in the waste composition of at least 0.5%, measured on a wet weight basis.

According to one embodiment of the present invention, if a neutralizing agent is used to reduce the total available lime concentration to 2.0% measured on a wet weight basis, dolomitic lime is added in an amount sufficient to achieve a magnesium oxide equivalents concentration of at least 1.0–3.0%, measured on a wet weight basis.

According to another embodiment of the present invention, the buffered hazardous waste composition includes ferrous sulfate in an amount of 1–30%, measured on a wet weight basis. Preferably, ferrous sulfate is added to obtain a concentration of 3%, measured on a wet weight basis.

According to still another embodiment of the present invention, dolomitic lime is added in an amount sufficient to achieve a total available lime concentration of about at least 5.5%, and preferably 5.5–6.5%, measured on a wet weight basis.

BRIEF DESCRIPTION OF THE DRAWINGS

The invention is best understood from the following detailed description when read in connection with the accompanying drawings, in which.

DETAILED DESCRIPTION OF THE INVENTION

Figure 1:
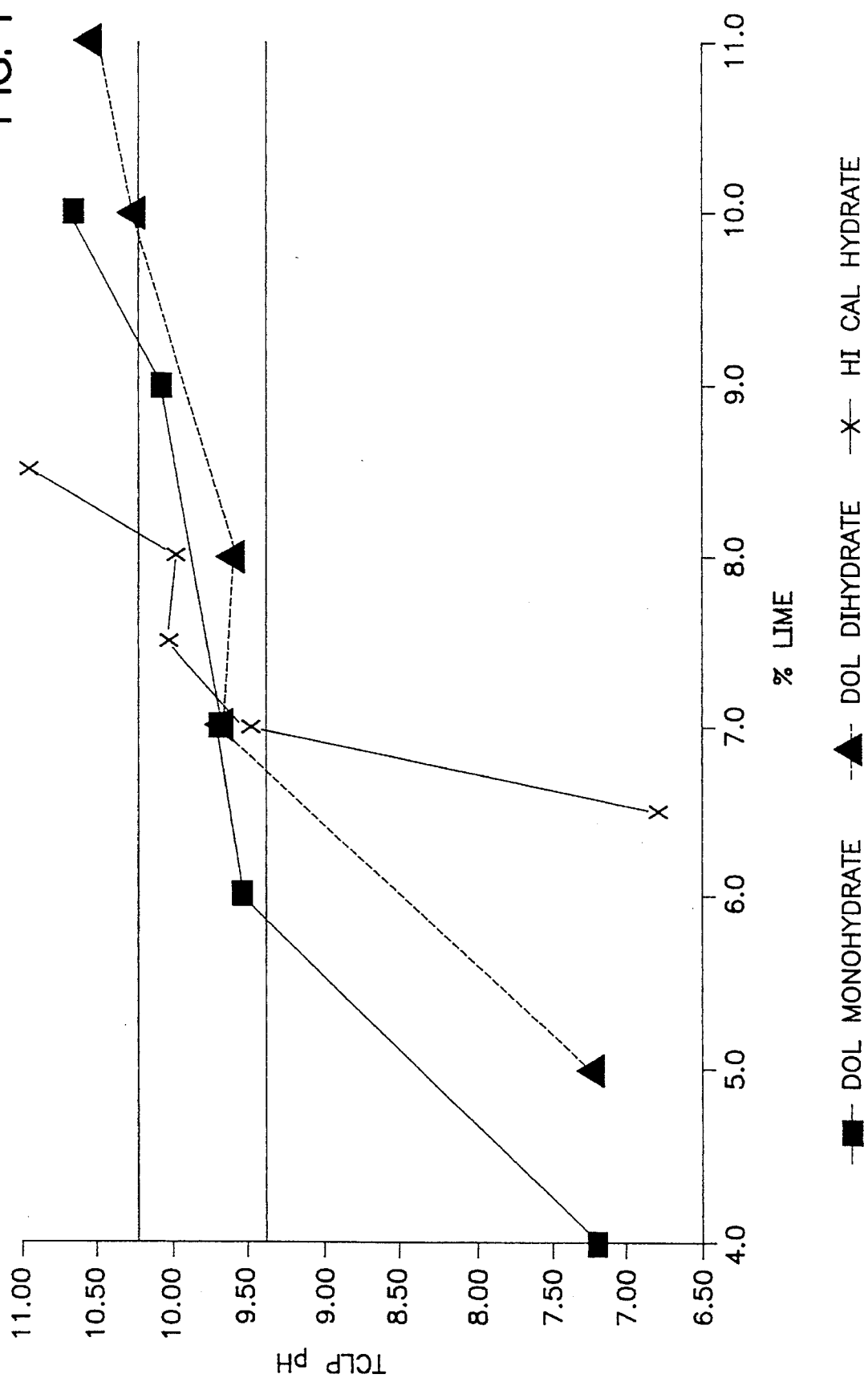
FIGS. 1,2,3,4,5 and 6 are graphs of Toxicity Characteristic Leaching Procedure (TCLP) final pH versus lime added for various hazardous waste compositions containing EAFD.

The present invention can be viewed as an improvement on U.S. Pat. No. 5,245,122, the teaching of which is incorporated herein by reference. The '122 patent discloses a method and a mixture for treating electric arc furnace dust (EAFD), by forming a mixture of EAFD, water, lime and, optionally, ferrous sulfate and then allowing the mixture to react to form a cementitiously hardened product.

According to the present invention, dolomitic lime is selected as the type of lime added in the composition disclosed in the '122 patent. Dolomitic lime serves as a buffering agent to maintain the pH of the hazardous waste composition containing EAFD within a narrow range over which the solubility of heavy metals is minimized. As used herein, the term "dolomitic lime" includes dolomitic quicklime ($CaO+MgO$), dolomitic monohydrated lime ($Ca(OH)_2+MgO$), and dolomitic dihydrated lime ($Ca(OH)_2+Mg(OH)_2$), all having a molecular ratio of calcium ions to magnesium ions in the range of about 1:1. More particularly, the term "dolomitic" indicates the presence of 35%–46% (by weight) of magnesium carbonate in the limestone from which the material was formed.

EAFD, which is defined in the '122 patent, typically contains some lime inherent in the EAFD. The lime inherent in EAFD is mostly quicklime (CaO). As in the '122 patent, the amount of lime in an EAFD or in a composition is calculated as "available lime," as defined in Section 28 of ASTM Designation: C 25–93a, entitled "Standard Test Methods for Chemical Analysis of Limestone, Quicklime, and Hydrated Lime." For purposes of this invention, the term "total available lime" includes both the lime available for reaction inherent in the EAFD plus any added lime (such as the dolomitic lime which serves as the buffering agent of the present invention) available for reaction as discussed in ASTM Designation: C 25–93a. Total available lime includes calcium oxide, calcium hydroxide, magnesium oxide and magnesium hydroxide, but does not include other calcium or magnesium sources, such as calcium silicates, calcium aluminates, calcium carbonate and magnesium carbonate. In the drawings, the x-axis represents lime added, although the total available lime is given in the examples below.

The amount of EAFD in the final hazardous waste composition varies over a broad range. As shown in the examples below, the content of EAFD varies over a range of from 63 to 76% on a wet weight basis, i.e., the weight of the constituent divided by the total weight of the mixture including the weight of water. The relative amount of the reactants of the cementitious reaction, namely EAFD, water, ferrous sulfate and lime, should be in sufficient proportions to carry out the cementitious reaction.

The operable range of the content of water is also broad. As shown in the examples below, water content ranges from 8 to 20%. Nonetheless, the reactants will still form the cementitiously hardened product if the mixture contains as much as 25% water. As disclosed in the '122 patent, the preferred water content may also be determined as the water content slightly less than that amount sufficient to permit the mixture to achieve an optimum density with compaction.

Optionally, ferrous sulfate may be added to the mixture. Ferrous sulfate may be added in crystalline form or as a solution thereof, and the operable range of ferrous sulfate is broad. In the examples below, ferrous sulfate is added in the amount of 3% to 10% (wet weight basis). However, as discussed in the '122 patent, the amount of ferrous sulfate may be anywhere from 0% to 30%. Ferrous sulfate serves to reduce hexavalent chromium to trivalent chromium, which is the less soluble form of chromium. Also, ferrous sulfate assists in the formation of lead sulfate ($PbSO_4$), a less soluble form of lead. Accordingly, no ferrous sulfate would be needed if it was determined that the waste included little or no hexavalent chromium or soluble lead.

The buffering agent of the present invention, namely dolomitic lime, serves to maintain the pH of the composition during and after acid exposure over a range which minimizes heavy metal solubility. This range depends on the source of EAFD, the number of heavy metals which are intended to be kept at a minimum solubility, and the desired maximum concentration of each heavy metal in the leachate. For example, as shown in Table A, an approximate pH range of from 8.5 to 11 is acceptable for EAFD from source E, because source E includes only four metals, namely lead, cadmium, chromium and nickel due to regulatory constraints applicable at the time the tests in Table A were performed. A more narrow range is required for the EAFD from sources A through D, some of which include up to thirteen metals.

TABLE A

| Source | Proven Acceptance pH Range |
| --- | --- |
| A | 9.40–10.10 |
| B | 9.50–10.05 |
| C | 8.80–9.90 |
| D | 9.5–10.25 |
| E | 8.5–11.0 |

As used above, the term "proven acceptance" means that, within the pH ranges indicated, the metal contents in the leachates from these samples are below the limits set forth in the EPA's "generic exclusion" standard, as set forth in Federal Register, Vol. 57 No. 160, Aug. 18, 1992. Specifically, Table B lists the thirteen metals and the leachate concentrations which cannot be exceeded to meet the EPA's generic exclusion standard.

TABLE B

| Metal | Leachate Conc. (mg/l) |
| --- | --- |
| Antimony | 0.10 |
| Arsenic | 0.50 |
| Barium | 7.6 |
| Beryllium | 0.010 |
| Cadmium | 0.050 |
| Chromium (total) | 0.33 |
| Lead | 0.15 |
| Mercury | 0.009 |
| Nickel | 1.0 |
| Selenium | 0.16 |
| Silver | 0.30 |
| Thallium | 0.02 |
| Zinc | 70.0 |

Based on the analysis of the metal contents in the leachates of the experiments from the examples below, maintaining a waste composition containing EAFD within a pH range of from 9.4 to 10.2 achieves the EPA's generic exclusion standard for essentially all known EAFD sources. In addition, maintaining a waste composition containing EAFD within a pH range of from 8.5 to 11.5 reduces heavy metal ion solubility.

The amount of dolomitic lime can vary over a wide range. Dolomitic lime should be added in an amount sufficient to achieve a magnesium oxide equivalents concentration of at least 0.5%, measured on a wet weight basis, to achieve a buffering effect in the field. It should be noted that, in controlled ideal lab conditions, it has been discovered that when the available lime content of EAFD (with no additives) is between 5.5% and 6.5%, the addition of dolomitic lime is not necessary. In the field, however, refraining from destroying some of the calcium oxide and adding some dolomitic lime is not practical because of fluctuations of lime content depending on the EAFD source and poor mixing of the components. More specifically, the presence of dolomitic lime in amount to achieve at least 0.5% magnesium oxide equivalents allows for a wider variance in lime content while maintaining an acceptable pH range. In a preferred embodiment of the present invention, dolomitic lime should be added in an amount sufficient to achieve a total available lime concentration of at least 5.5% and preferably about 5.5–6.5%, measured on a wet weight basis. The amount of dolomitic lime necessary to achieve this total available lime concentration depends on the amount of lime inherent in the EAFD waste.

According to the method of the present invention, the EAFD waste is first analyzed to determine the amount of lime inherent in the EAFD waste. Such lime is typically in the form of calcium oxide. If the concentration of total available lime (in the form of calcium oxide) inherent in the EAFD waste exceeds 4.0% (or 2.0%) measured on a wet weight basis, a neutralizing agent is added in an amount sufficient to reduce total available lime concentration to 4.0% (or 2.0%), measured on a wet weight basis. According to one embodiment of the invention, if the concentration of total available lime inherent in the EAFD waste is 2.0% (either following neutralization or because neutralization was not required), dolomitic lime is then added in an amount sufficient to achieve a magnesium oxide equivalents concentration of at least 1.0–3.0%, measured on a wet weight basis.

Any known neutralizing agent may be used to reduce the total available lime concentration and to decrease the pH of the composition. Liquid acids, such as sulfuric acid, may be used as the neutralizing agent, as long as the equipment can accommodate the acidic conditions and the additional release of heat caused by the neutralization of lime by the acid. Ferrous sulfate, in addition to rendering chromium and lead less soluble, can also serve as a neutralizing agent. The amount of ferrous sulfate should be that amount necessary to reduce total available lime concentration to 4.0% (or 2.0%), and is typically 1–30%. Ferrous sulfate should be added in an approximate 3:1 ratio for each percent of total available lime that is to be neutralized. One disadvantage of the use of ferrous sulfate is the increase in the volume of the waste, which is subsequently placed in a landfill.

According to another embodiment of the invention, gaseous carbon dioxide is selected as the neutralizing agent. It has been discovered that exposing a hazardous waste composition containing EAFD and water to carbon dioxide causes some of the calcium oxide inherent in the EAFD to form calcium carbonate. According to this embodiment, equipment capable of accommodating acidic conditions is not necessary, and the volume of the waste is not significantly increased. Furthermore, the expanding gas dissipates some of the heat of reaction. As in other embodiments, following carbon dioxide treatment to reduce total available lime concentration to below 4% and preferably to 2.0%, dolomitic lime is added to achieve the necessary magnesium oxide equivalents concentration.

It is unexpected that dolomitic monohydrated lime or dolomitic dihydrated lime would cause the pH value to approach or fall within the "optimum pH range" of 9.4 to 10.2. As shown in Table C below, the pH of dolomitic monohydrate in water after 24 hours is 11.5 and that of dolomitic dihydrate is 11.3. Despite this, from the examples shown below, the inclusion of dolomitic monohydrate and dolomitic dihydrate in EAFD mixtures causes the pH value to approach or to be substantially maintained between the optimum pH range of 9.4 to 10.2.

sitions used in the experiments reported in the examples below were not permitted to react prior to being subjected to the TCLP test.

The cementitiously-formed product from the mixture of the present invention has unconfined compressive strength and permeability characteristics which indicate a chemically

TABLE C pH & Solubility of Selected Materials In Water

| NAME | COMPOSITION | pH 4 Hours | pH 24 Hours | pH 7 Days | SOLUBILITY (g Salt/100 ml $H_2O$) Low Temperature (0–25° C.) | SOLUBILITY (g Salt/100 ml $H_2O$) High Temperature (75–100° C.) |
|---|---|---|---|---|---|---|
| Quicklime | CaO | 11.6 | 11.7 | 11.2 | 0.185* | 0.077* |
| Dolomitic Monohydrate | $Ca(OH)_2 \cdot MgO$ | 11.6 | 11.5 | 11.6 | 0.185 + 0.00062** | 0.077 + 0.0086** |
| Dolomitic DiHydrate | $Ca(OH)_2 \cdot Mg(OH)_2$ | 11.5 | 11.3 | 11.7 | 0.185 + 0.0009** | 0.077 + 0.004** |
| Magnesium Oxide | MgO | 10.2 | 10.6 | 10.3 | 0.00062 | 0.0086 |
| Magnesium Carbonate | $MgCO_3$ | 9.6 | 9.5 | 9.5 | 0.0106 | 0.011 |

*As $Ca(OH)_2$
**These values are the solubilities of the two components.

Because the pH of magnesium carbonate in water after 24 hours is 9.5 which is within this optimum pH range, it is possible that the magnesium from the dolomitic lime reacts with trace amounts of carbonate ions (from limestone ($CaCO_3$) inherent in added lime) to form magnesium carbonate. Thus, instead of driving the pH value towards 11.5, the addition of dolomitic hydrated lime appears to maintain the post-TCLP pH within the optimum range, perhaps because of the formation of magnesium carbonate. The results of Example 7 confirm that magnesium carbonate does, in fact, serve as a buffer itself.

Although no experiments show that dolomitic quicklime serves as a buffering agent, it is believed that dolomitic quicklime would also maintain the pH value of the composition within the optimum pH range, provided that (1) the quicklime is ground to a fineness approaching hydrated limes shortly before interblending or (2) the quicklime is slaked (i.e., reacted with water) shortly before interblending. Dolomitic quicklime is typically significantly coarser than the hydrated forms, which inhibits adequate dispersion. In addition, the larger particles of quicklime, exposed directly to ferrous sulfate, may form a gypsum shell around the quicklime particles thereby inhibiting reactivity.

By either grinding the quicklime or slaking the quicklime shortly before interblending, it is believed that the quicklime would be sufficiently reactive. The magnesium ions in dolomitic quicklime appear in the same form, namely as magnesium oxide (MgO), as the magnesium ions in dolomitic monohydrate, which has been shown to maintain the pH value within the optimum pH range. Thus, magnesium in dolomitic quicklime should form magnesium carbonate, which is believed to be the reason for maintaining the compositions within the optimum pH range.

Regardless of the particular type of dolomitic lime selected, after mixing the constituents, the mixture is permitted to react (or cure) to form a cementitiously hardened product. The reaction may be accomplished, for example, by permitting the mixture to react for seven days at 100° F. More commonly, field curing time, equivalent to seven days at 100° F., is used. A typical field curing time is thirty days at 73° F., for example. It should be noted that the compostable product. More specifically, the cementitiously hardened product formed from the mixture of the present invention has the characteristics as disclosed in the '122 patent. When maintained within a pH range of 9.4 to 10.2, the metal contents of the leachates are below the limits set forth in Federal Register, Vol. 57 No. 160, Aug. 18, 1992.

In addition, as shown by Table C, dolomitic lime is substantially insoluble in water. For example, dolomitic monohydrated lime has a solubility at low temperature (measured in grams of salt/100 ml $H_2O$) of 0.185 and 0.00062 for calcium hydroxide and magnesium oxide, respectively. Dolomitic dihydrated lime has a solubility at low temperature of 0.185 and 0.0009 for calcium hydroxide and magnesium hydroxide, respectively. Although not shown, dolomitic quicklime, which reacts with water, would have a solubility at low temperature of 0.185 and 0.00062 for calcium oxide (as calcium hydroxide) and magnesium oxide, respectively. Furthermore, all three types of dolomitic lime are available as fine, dry powders to facilitate proportioning and mixing.

The following examples are included to more clearly demonstrate the overall nature of the invention. These examples are exemplary, not restrictive, of the invention.

EXAMPLES

Examples 1 though 7 each report a final TCLP pH value of various compositions. The final TCLP pH value was determined in accordance with the EPA Toxicity Characteristic Leaching Procedure (TCLP), method 1311, Revision O, November 1990, which is incorporated herein by reference. In summary, this procedure involves agitating the waste composition, immediately after the compositions are interblended, for 16 hours while exposing the composition to an acetic acid solution. After this period of agitation and exposure to acid, the leachate is then analyzed for metals content.

EXAMPLE 1

Fourteen EAFD samples, from source "B", were mixed with ferrous sulfate, water, and a buffering agent selected from either dolomitic monohydrated lime, dolomitic dihydrated lime or high-calcium hydrated lime. The EAFD from source "B" contains approximately 1.5% total available lime in the form of calcium oxide. FIG. and Table D show the available lime added.

TABLE D

| | MIX DESIGN | | | | | | |
|---|---|---|---|---|---|---|---|
| | 1 | 2 | 3 | 4 | 5 | 6 | 7 |
| LIME TYPE* | 1 | 1 | 1 | 2 | 2 | 2 | 1 |
| EAFD % | 73.0 | 70.0 | 67.0 | 72.0 | 69.0 | 66.0 | 71.0 |
| LIME % | 4.0 | 7.0 | 10.0 | 5.0 | 8.0 | 11.0 | 6.0 |
| FeSO4.7H2O % | 3.0 | 3.0 | 3.0 | 3.0 | 3.0 | 3.0 | 3.0 |
| WATER % | 20.0 | 20.0 | 20.0 | 20.0 | 20.0 | 20.0 | 20.0 |
| FINAL TCLP pH | 7.20 | 9.70 | 10.70 | 7.25 | 9.65 | 10.60 | 9.55 |

| | MIX DESIGN | | | | | | |
|---|---|---|---|---|---|---|---|
| | 8 | 9 | 10 | 11 | 12 | 13 | 14 |
| LIME TYPE* | 1 | 2 | 2 | 3 | 3 | 3 | 3 |
| EAFD % | 68.0 | 70.0 | 67.0 | 70.0 | 69.5 | 69.0 | 68.5 |
| LIME % | 9.0 | 7.0 | 10.0 | 7.0 | 7.5 | 8.0 | 8.5 |
| FeSO4.7H2O % | 3.0 | 3.0 | 3.0 | 3.0 | 3.0 | 3.0 | 3.0 |
| WATER % | 20.0 | 20.0 | 20.0 | 20.0 | 20.0 | 20.0 | 20.0 |
| FINAL TCLP pH | 10.10 | 9.70 | 10.30 | 9.50 | 10.05 | 10.00 | 11.00 |

*1 = Monohydrated Lime
2 = Dihydrated Lime
3 = Hi Cal Hydrated Lime

Table E below shows the amount of total available lime for each sample (i.e., available lime inherent in the EAFD plus available lime added) and magnesium oxide equivalents for each sample. As used herein, the term "magnesium oxide equivalents" means the total of any magnesium oxide or magnesium hydroxide found in the added lime, converted to magnesium oxide equivalents. Included in this definition is magnesium carbonate, which is also converted to magnesium oxide equivalents.

TABLE E

| Sample No. | Total Available Lime (wet weight basis) | MgO Equiv. (wet weight basis) |
|---|---|---|
| 1 | 4.47 | 1.41 |
| 2 | 6.95 | 2.47 |
| 3 | 9.43 | 3.52 |
| 4 | 4.54 | 1.52 |
| 5 | 6.86 | 2.43 |
| 6 | 9.00 | 3.35 |
| 7 | 6.12 | 2.12 |
| 8 | 8.61 | 3.17 |
| 9 | 6.15 | 2.13 |
| 10 | 8.28 | 3.05 |
| 11 | 6.35 | 0 |
| 12 | 6.72 | 0 |
| 13 | 7.10 | 0 |
| 14 | 7.46 | 0 |

The samples were subjected to sixteen hours of agitation, while exposed to an acetic acid solution, in accordance with the TCLP. The final TCLP pH was then measured. Table D shows the compositions of each sample, as well as the final TCLP pH. The final TCLP pH versus percent lime added (wet weight basis) is graphed in FIG. 1.

As shown by FIG. 1, with the selected lime being dolomitic monohydrated lime, the pH is maintained within the optimum range (9.4 to 10.2) over a formulation variance of over 3.0% dolomitic monohydrated lime added. In addition, the pH value is maintained within the optimum range when dolomitic dihydrated lime is selected for a formulation variance of approximately 3.0% dolomitic dihydrated lime added. The pH value is maintained within the optimum range when the concentration of magnesium oxide equivalents is 2.12–3.17% (except for Sample No. 10). On the other hand, when high calcium hydrated lime is chosen, the composition stays in the desired range for a formulation variance of only approximately 1.2% high calcium hydrated lime. Thus, dolomitic monohydrated lime and dolomitic dihydrated lime serve as buffering agents for EAFD from source B to maintain the pH value within the optimum range.

EXAMPLE 2

Figure 2:
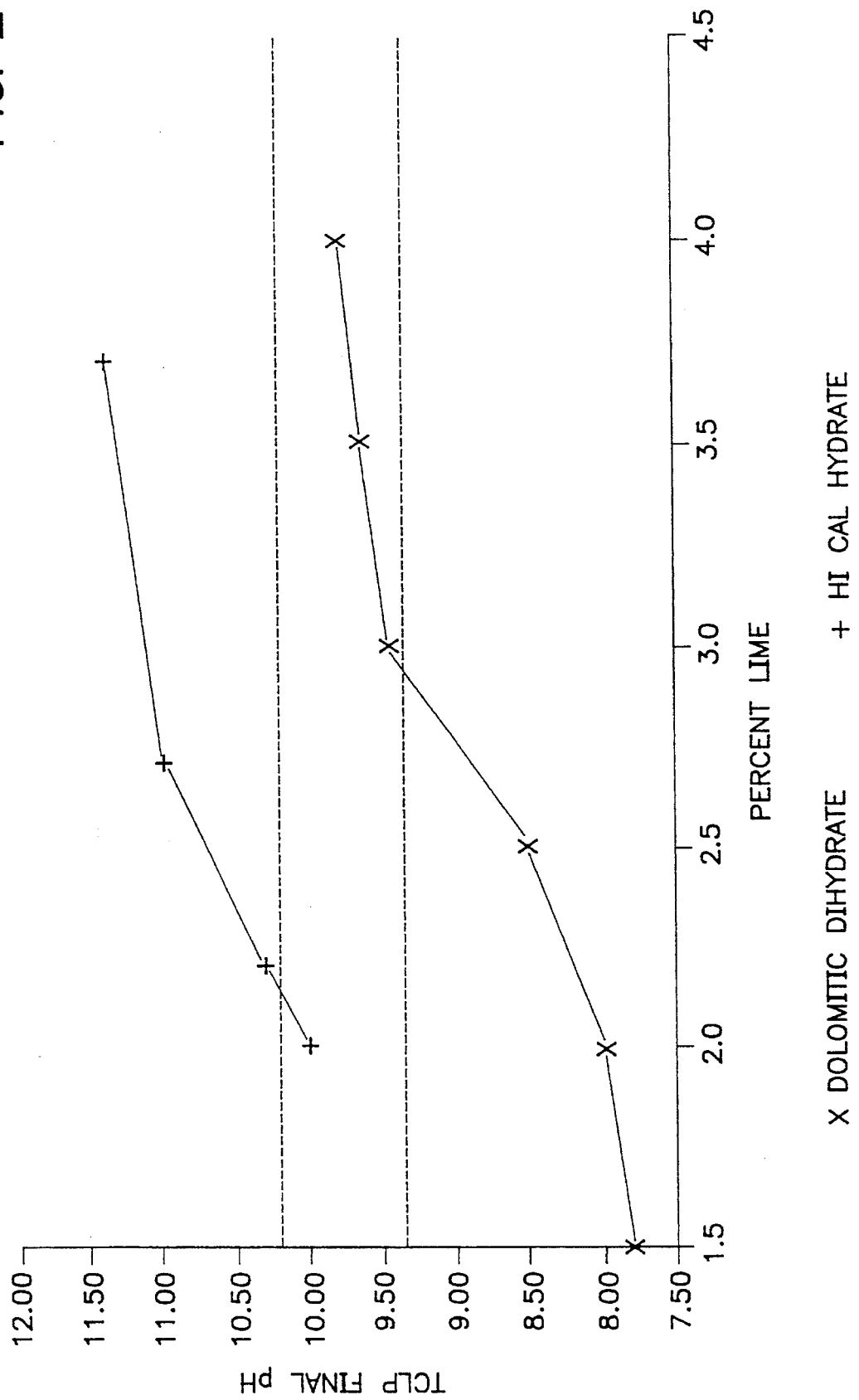

Eleven EAFD samples, from source "F", were mixed with ferrous sulfate, water, and a buffering agent selected from either dolomitic dihydrated lime or high-calcium hydrated lime. The EAFD from source "F" contains approximately 5.0% total available lime in the form of calcium oxide. FIG. 2 and Table F show the available lime added.

TABLE F

| | Mix #: | | | | |
|---|---|---|---|---|---|
| | 1 | 2 | 3 | 4 | 5 |
| Lime Type* | 1 | 1 | 1 | 1 | 1 |
| EAFD % | 75.8 | 75.8 | 75.8 | 75.8 | 75.8 |
| Lime % | 2.0 | 1.5 | 2.5 | 3.0 | 3.5 |
| FeSO4.7H2O % | 6.0 | 6.0 | 6.0 | 6.0 | 6.0 |
| H2O % | 16.2 | 16.7 | 15.7 | 15.2 | 14.7 |
| Final pH | 8.00 | 7.80 | 8.50 | 9.45 | 9.65 |

| | Mix #: | | | | | |
|---|---|---|---|---|---|---|
| | 6 | 7 | 8 | 9 | 10 | 11 |
| Lime Type* | 1 | 2 | 2 | 2 | 2 | 2 |
| EAFD % | 75.8 | 75.8 | 75.6 | 75.1 | 74.1 | 75.3 |
| Lime % | 4.0 | 2.0 | 2.2 | 2.7 | 3.7 | 4.5 |
| FeSO4.7H2O % | 6.0 | 6.0 | 6.0 | 6.0 | 6.0 | 6.0 |
| H2O % | 14.2 | 16.2 | 16.2 | 16.2 | 16.2 | 16.2 |
| Final pH | 9.80 | 10.00 | 10.30 | 11.00 | 11.40 | 11.60 |

*1 = Dolomitic Dihydrated Lime
2 = Hi Cal Hydrated Lime

Table G below shows the amount of total available lime for each sample (i.e., available lime inherent in the EAFD plus available lime added) and magnesium oxide equivalents for each sample:

TABLE G

| Sample No. | Total Available Lime (wet weight basis) | MgO Equiv. (wet weight basis) |
|---|---|---|
| 1 | 5.25 | 0.61 |
| 2 | 4.86 | 0.46 |
| 3 | 5.61 | 0.76 |
| 4 | 5.97 | 0.92 |
| 5 | 6.34 | 1.06 |
| 6 | 6.70 | 1.22 |
| 7 | 5.48 | 0 |
| 8 | 5.63 | 0 |
| 9 | 6.04 | 0 |
| 10 | 6.82 | 0 |
| 11 | 7.55 | 0 |

The samples were subjected to sixteen hours of agitation, while exposed to an acetic acid solution, in accordance with the TCLP. The final TCLP pH was then measured. Table F shows the compositions of each sample, as well as the final TCLP pH. The final TCLP pH versus percent lime added (wet weight basis) is graphed in FIG. 2.

As shown by FIG. 2, with the selected lime being dolomitic dihydrated lime, the pH is maintained within the optimum range (9.4 to 10.2) over a formulation variance of at least 1.0% dolomitic dihydrated lime. The pH value is maintained within the optimum range when the concentration of magnesium oxide equivalents is 0.92–1.22%. On the other hand, when high calcium hydrated lime is chosen, the composition stays in the desired range for a formulation variance of only approximately 0.2% high calcium hydrated lime. Thus, dolomitic dihydrated lime serves as a buffering agent for EAFD from source F to maintain the pH value within the optimum range.

EXAMPLE 3

Figure 3:
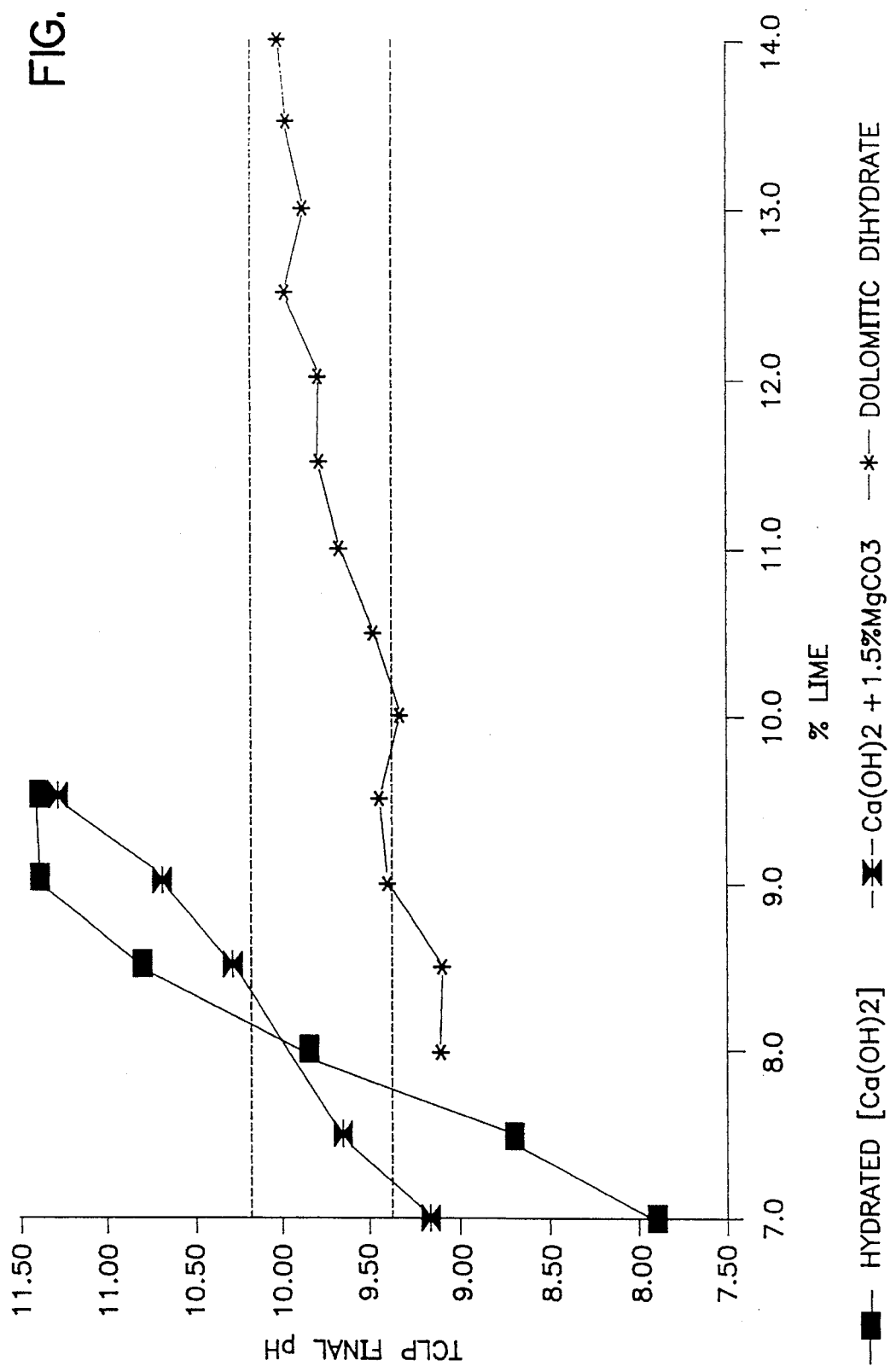

Twenty-five EAFD samples, from source "G", were mixed with ferrous sulfate, water, and a buffering agent selected from either dolomitic dihydrated lime, calcium hydroxide, or calcium hydroxide with 1.5 % magnesium carbonate added. The EAFD from source "G" contains approximately 0.4% total available lime in the form of calcium oxide. FIG. 3 and Table H show the available lime added.

TABLE H

| | MIX 1 | MIX 2 | MIX 3 | MIX 4 | MIX 5 |
|---|---|---|---|---|---|
| EAFD % | 75.0 | 74.5 | 74.0 | 73.5 | 73.0 |
| Hydrated Lime % | 7.0 | 7.5 | 8.0 | 8.5 | 9.0 |
| FeSO4.7H2O % | 3.0 | 3.0 | 3.0 | 3.0 | 3.0 |
| Water % | 8.0 | 8.0 | 8.0 | 8.0 | 8.0 |
| Final TCLP pH | 7.90 | 8.70 | 9.85 | 10.80 | 11.40 |

| | MIX 6 | MIX 7 | MIX 8 | MIX 9 | MIX 10 |
|---|---|---|---|---|---|
| EAFD % | 72.5 | 75.0 | 74.5 | 74.0 | 73.5 |
| Hydrated Lime % | 9.5 | 7.0 | 7.5 | 8.0 | 8.5 |
| FeSO4.7H2O % | 3.0 | 3.0 | 3.0 | 3.0 | 3.0 |
| Water % | 8.0 | 6.9 | 6.9 | 6.9 | 6.9 |
| MgCO3 % | | 1.1 | 1.1 | 1.1 | 1.1 |
| Final TCLP pH | 11.40 | 9.15 | 9.65 | 9.90 | 10.30 |

| | MIX 11 | MIX 12 | MIX 13 | MIX 14 | MIX 15 |
|---|---|---|---|---|---|
| EAFD % | 73.0 | 72.5 | 74.0 | 73.5 | 73.0 |
| Dehydrated Lime % | 9.0 | 9.5 | 8.0 | 8.5 | 9.0 |
| FeSO4.7H2O % | 3.0 | 3.0 | 3.0 | 3.0 | 3.0 |
| Water % | 6.9 | 6.9 | 8.0 | 8.0 | 8.0 |
| MgCO3 % | 1.1 | 1.1 | | | |
| Final TCLP pH | 10.70 | 11.30 | 9.10 | 9.10 | 9.40 |

| | MIX 16 | MIX 17 | MIX 18 | MIX 19 | MIX 20 |
|---|---|---|---|---|---|
| EAFD % | 72.5 | 72.0 | 71.5 | 71.0 | 70.5 |
| Dehydrated Lime % | 9.5 | 10.0 | 10.5 | 11.0 | 11.5 |
| FeSO4.7H2O % | 3.0 | 3.0 | 3.0 | 3.0 | 3.0 |
| Water % | 8.0 | 8.0 | 8.0 | 8.0 | 8.0 |
| Final TCLP pH | 9.45 | 9.35 | 9.50 | 9.70 | 9.80 |

| | MIX 21 | MIX 22 | MIX 23 | MIX 24 | MIX 25 |
|---|---|---|---|---|---|
| EAFD % | 70.0 | 69.5 | 69.0 | 68.5 | 68.0 |
| Dehydrated Lime % | 12.0 | 12.5 | 13.0 | 13.5 | 14.0 |
| FeSO4.7H2O % | 3.0 | 3.0 | 3.0 | 3.0 | 3.0 |
| Water % | 8.0 | 8.0 | 8.0 | 8.0 | 8.0 |
| Final TCLP pH | 9.80 | 10.00 | 9.90 | 10.00 | 10.05 |

Table I below shows the amount of total available lime for each sample (i.e., available lime inherent in the EAFD plus available lime added) and magnesium oxide equivalents for each sample:

TABLE I

| Sample No. | Total Available Lime (wet weight basis) | MgO Equiv. (wet weight basis) |
|---|---|---|
| 1 | 5.60 | 0 |
| 2 | 5.98 | 0 |
| 3 | 6.36 | 0 |
| 4 | 6.72 | 0 |
| 5 | 7.10 | 0 |
| 6 | 7.48 | 0 |
| 7 | 5.60 | 0.53 |
| 8 | 5.98 | 0.53 |
| 9 | 6.36 | 0.53 |
| 10 | 6.72 | 0.53 |
| 11 | 7.10 | 0.53 |
| 12 | 7.48 | 0.53 |
| 13 | 6.12 | 2.44 |
| 14 | 6.49 | 2.59 |
| 15 | 6.84 | 2.74 |
| 16 | 7.21 | 2.90 |
| 17 | 7.57 | 3.05 |
| 18 | 7.93 | 3.20 |
| 19 | 8.29 | 3.36 |
| 20 | 8.65 | 3.51 |
| 21 | 9.02 | 3.66 |
| 22 | 9.38 | 3.81 |
| 23 | 9.74 | 3.96 |
| 24 | 10.10 | 4.12 |
| 25 | 10.46 | 4.27 |

The samples were subjected to sixteen hours of agitation, while exposed to an acetic acid solution, in accordance with the TCLP. The final TCLP pH was then measured. Table H shows the compositions of each sample, as well as the final TCLP pH. The final TCLP pH versus percent lime added (wet weight basis) is graphed in FIG. 3.

As shown by FIG. 3, with the selected lime being dolomitic dihydrated lime, the pH is maintained within the optimum range (9.4 to 10.2) over a formulation variance of about 5.0% dolomitic dihydrated lime. The pH value is maintained within the optimum range when the concentration of magnesium oxide equivalents is 0.53–4.27% (except for Sample Nos. 13 and 14). On the other hand, when calcium hydroxide is chosen, the composition stays in the desired range for a formulation variance of less than 0.5% calcium hydroxide. Also, when calcium hydroxide plus 1.5% magnesium carbonate is chosen, the composition stays in the desired range for a formulation variance of less than 1.0% calcium hydroxide. Thus, dolomitic dihydrated lime serves as a buffering agent for EAFD from source G to maintain the pH value within the optimum range.

EXAMPLE 4

Figure 4:
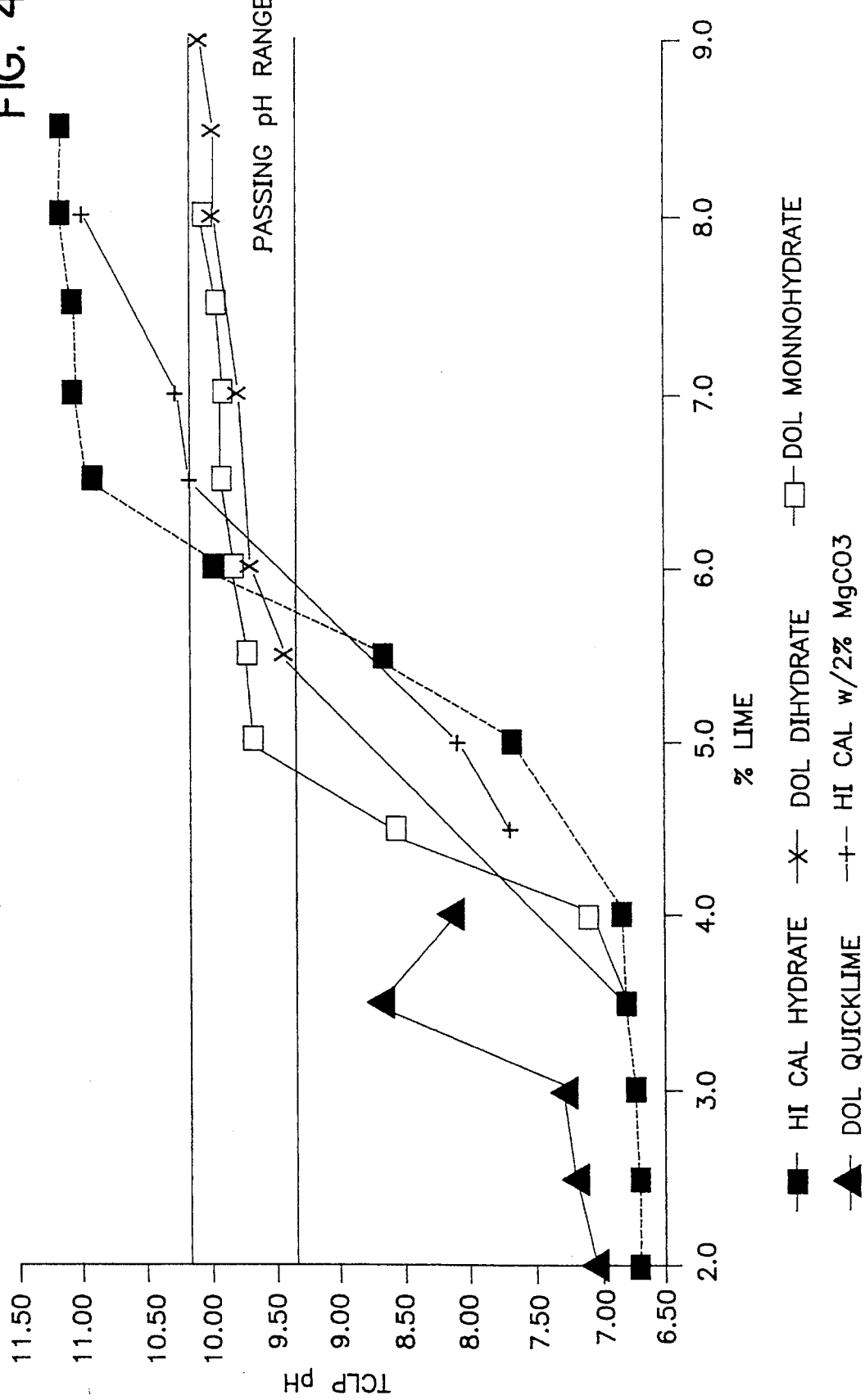

Forty EAFD samples, from source "H", were mixed with ferrous sulfate, water, and a buffering agent selected from either dolomitic monohydrated lime, dolomitic dihydrated lime, dolomitic quicklime, high-calcium hydrated lime or high-calcium hydrated lime with 2% magnesium carbonate. The EAFD from source "H" contains approximately 0.3% total available lime in the form of calcium oxide. FIG. 4 and Table J show the available lime added.

TABLE J

| | MIX 1 | MIX 2 | MIX 3 | MIX 4 | MIX 5 |
|---|---|---|---|---|---|
| EAFD % | 70.0 | 69.5 | 69.0 | 68.5 | 68.0 |
| LIME % | 2.0 | 2.5 | 3.0 | 3.5 | 4.0 |
| FeSO4 SOLN. % | 10.0 | 10.0 | 10.0 | 10.0 | 10.0 |
| WATER % | 18.0 | 18.0 | 18.0 | 18.0 | 18.0 |
| LIME TYPE* | 1 | 1 | 1 | 1 | 1 |
| FINAL TCLP pH | 6.70 | 6.70 | 6.75 | 6.80 | 6.85 |

| | MIX 6 | MIX 7 | MIX 8 | MIX 9 | MIX 10 |
|---|---|---|---|---|---|
| EAFD % | 67.0 | 66.5 | 66.0 | 65.5 | 65.0 |
| LIME % | 5.0 | 5.5 | 6.0 | 6.5 | 7.0 |
| FeSO4 SOLN. % | 10.0 | 10.0 | 10.0 | 10.0 | 10.0 |
| WATER % | 18.0 | 18.0 | 18.0 | 18.0 | 18.0 |
| LIME TYPE* | 1 | 1 | 1 | 1 | 1 |
| FINAL TCLP pH | 7.70 | 8.70 | 9.95 | 10.90 | 11.10 |

| | MIX 11 | MIX 12 | MIX 13 | MIX 14 | MIX 15 |
|---|---|---|---|---|---|
| EAFD % | 64.5 | 64.0 | 63.5 | 68.5 | 66.5 |
| LIME % | 7.5 | 8.0 | 8.5 | 3.5 | 5.5 |
| FeSO4 SOLN. % | 10.0 | 10.0 | 10.0 | 10.0 | 10.0 |
| WATER % | 18.0 | 18.0 | 18.0 | 18.0 | 18.0 |
| MgCO3 %** | | | | 0.0 | 0.0 |
| LIME TYPE* | 1 | 1 | 1 | 2 | 2 |
| FINAL TCLP pH | 11.10 | 11.25 | 11.25 | 6.80 | 9.45 |

| | MIX 16 | MIX 17 | MIX 18 | MIX 19 | MIX 20 |
|---|---|---|---|---|---|
| EAFD % | 66.0 | 65.0 | 64.0 | 63.5 | 63.0 |
| LIME % | 6.0 | 7.0 | 8.0 | 8.5 | 9.0 |
| FeSO4 SOLN. % | 10.0 | 10.0 | 10.0 | 10.0 | 10.0 |
| WATER % | 18.0 | 18.0 | 18.0 | 18.0 | 18.0 |
| MgCO3 %** | 0.0 | 0.0 | 0.0 | 0.0 | 0.0 |
| LIME TYPE* | 2 | 2 | 2 | 2 | 2 |
| FINAL TCLP pH | 9.70 | 9.75 | 10.00 | 10.00 | 10.10 |

| | MIX 21 | MIX 22 | MIX 23 | MIX 24 | MIX 25 |
|---|---|---|---|---|---|
| EAFD % | 68.5 | 68.0 | 67.5 | 67.0 | 66.5 |
| LIME % | 3.5 | 4.0 | 4.5 | 5.0 | 5.5 |
| FeSO4 SOLN. % | 10.0 | 10.0 | 10.0 | 10.0 | 10.0 |
| WATER % | 18.0 | 18.0 | 18.0 | 18.0 | 18.0 |
| MgCO3 %** | 0.0 | 0.0 | 0.0 | 0.0 | 0.0 |
| LIME TYPE* | 3 | 3 | 3 | 3 | 3 |
| FINAL TCLP pH | 6.80 | 7.15 | 8.60 | 9.70 | 9.75 |

| | MIX 26 | MIX 27 | MIX 28 | MIX 29 | MIX 30 |
|---|---|---|---|---|---|
| EAFD % | 66.0 | 65.5 | 65.0 | 64.5 | 64.0 |
| LIME % | 6.0 | 6.5 | 7.0 | 7.5 | 8.0 |
| FeSO4 SOLN. % | 10.0 | 10.0 | 10.0 | 10.0 | 10.0 |
| WATER % | 18.0 | 18.0 | 18.0 | 18.0 | 18.0 |
| MgCO3 %** | 0.0 | 0.0 | 0.0 | 0.0 | 0.0 |
| LIME TYPE* | 3 | 3 | 3 | 3 | 3 |
| FINAL TCLP pH | 9.80 | 9.95 | 9.95 | 10.00 | 10.10 |

| | MIX 31 | MIX 32 | MIX 33 | MIX 34 | MIX 35 |
|---|---|---|---|---|---|
| EAFD % | 70.0 | 69.5 | 69.0 | 68.5 | 68.0 |
| LIME % | 2.0 | 2.5 | 3.0 | 3.5 | 4.0 |
| FeSO4 SOLN. % | 10.0 | 10.0 | 10.0 | 10.0 | 10.0 |
| WATER % | 18.0 | 18.0 | 18.0 | 18.0 | 18.0 |
| LIME TYPE* | 4 | 4 | 4 | 4 | 4 |
| FINAL TCLP pH | 7.05 | 7.15 | 7.30 | 8.70 | 8.20 |

| | MIX 36 | MIX 37 | MIX 38 | MIX 39 | MIX 40 |
|---|---|---|---|---|---|
| EAFD % | 67.5 | 67.0 | 65.5 | 65.0 | 64.0 |
| LIME % | 4.5 | 5.0 | 6.5 | 7.0 | 8.0 |
| FeSO4 SOLN. % | 10.0 | 10.0 | 10.0 | 10.0 | 10.0 |
| WATER % | 18.0 | 18.0 | 18.0 | 18.0 | 18.0 |

TABLE J-continued

| | | | | | |
|---|---|---|---|---|---|
| LIME TYPE* | 5 | 5 | 5 | 5 | 5 |
| FINAL TCLP pH | 7.70 | 8.15 | 10.20 | 10.30 | 11.00 |

*1 = Hi Cal Hydrated Lime
2 = Dihydrated Lime
3 = Monohydrated Lime
4 = Quicklime
5 = Hi Cal Hydrated Lime w/2% MgCO3 (based on EAFD weight)
**As percent of EAFD.

Table K below shows the amount of total available lime for each sample (i.e., available lime inherent in the EAFD plus available lime added) and magnesium oxide equivalents for each sample:

TABLE K

| Sample No. | Total Available Lime (wet weight basis) | MgO Equiv. (wet weight basis) |
|---|---|---|
| 1 | 1.36 | 0 |
| 2 | 2.10 | 0 |
| 3 | 2.48 | 0 |
| 4 | 2.86 | 0 |
| 5 | 3.23 | 0 |
| 6 | 3.98 | 0 |
| 7 | 4.36 | 0 |
| 8 | 4.74 | 0 |
| 9 | 5.12 | 0 |
| 10 | 5.50 | 0 |
| 11 | 5.87 | 0 |
| 12 | 6.15 | 0 |
| 13 | 6.62 | 0 |
| 14 | 2.76 | 1.07 |
| 15 | 4.20 | 1.68 |
| 16 | 4.57 | 1.83 |
| 17 | 5.30 | 2.14 |
| 18 | 6.01 | 2.44 |
| 19 | 6.38 | 2.59 |
| 20 | 6.74 | 2.74 |
| 21 | 3.15 | 1.24 |
| 22 | 3.57 | 1.41 |
| 23 | 3.99 | 1.59 |
| 24 | 4.41 | 1.76 |
| 25 | 4.84 | 1.94 |
| 26 | 5.26 | 2.12 |
| 27 | 5.68 | 2.29 |
| 28 | 6.10 | 2.47 |
| 29 | 6.51 | 2.65 |
| 30 | 6.93 | 2.82 |
| 31 | 2.21 | 0 |
| 32 | 2.71 | 0 |
| 33 | 3.21 | 0 |
| 34 | 3.71 | 0 |
| 35 | 4.20 | 0 |
| 36 | 3.54 | 0.96 |
| 37 | 3.91 | 0.96 |
| 38 | 5.02 | 0.96 |
| 39 | 5.39 | 0.96 |
| 40 | 6.13 | 0.96 |

The samples were subjected to sixteen hours of agitation, while exposed to an acetic acid solution, in accordance with the TCLP. The final TCLP pH was then measured. Table J shows the compositions of each sample, as well as the final TCLP pH. The final TCLP pH versus percent lime added (wet weight basis) is graphed in FIG. 4.

As shown by FIG. 4, with the selected lime being dolomitic monohydrated lime, the pH is maintained within the optimum range (9.4 to 10.2) over a formulation variance of over 3.0% dolomitic monohydrated lime. In addition, the pH value is maintained within the optimum range when dolomitic dihydrated lime is selected for a formulation variance of over 3.5% dolomitic dihydrated lime. The pH value is maintained within the optimum range when the concentration of magnesium oxide equivalents is 0.96–2.82% (except for Sample Nos. 14 and 21–23). On the other hand, when high calcium hydrated lime is chosen, the composition stays in the desired range for a formulation variance of less than 0.5% high calcium hydrated lime. Also, when high calcium hydrated lime with 2% magnesium carbonate is chosen, the composition stays in the desired range for a formulation variance of less than 1.0% high calcium hydrated lime. Thus, dolomitic monohydrated lime and dolomitic dihydrated lime serve as buffering agents for EAFD from source H to maintain the pH value within the optimum range.

Although dolomitic quicklime failed to maintain the pH in the optimum pH range in this example, it is believed that the reason for this was that the quicklime used was more coarse than the hydrated limes. Quicklime is rarely found as fine as hydrated lime because quicklime tends to hydrate and/or carbonate due to exposure to air during pulverizing or storage. When larger quicklime particles are exposed to ferrous sulfate, the particles are immediately coated with a gypsum shell. This shell isolates the particle interior, wasting a significant portion of the lime.

EXAMPLE 5

Figure 5:
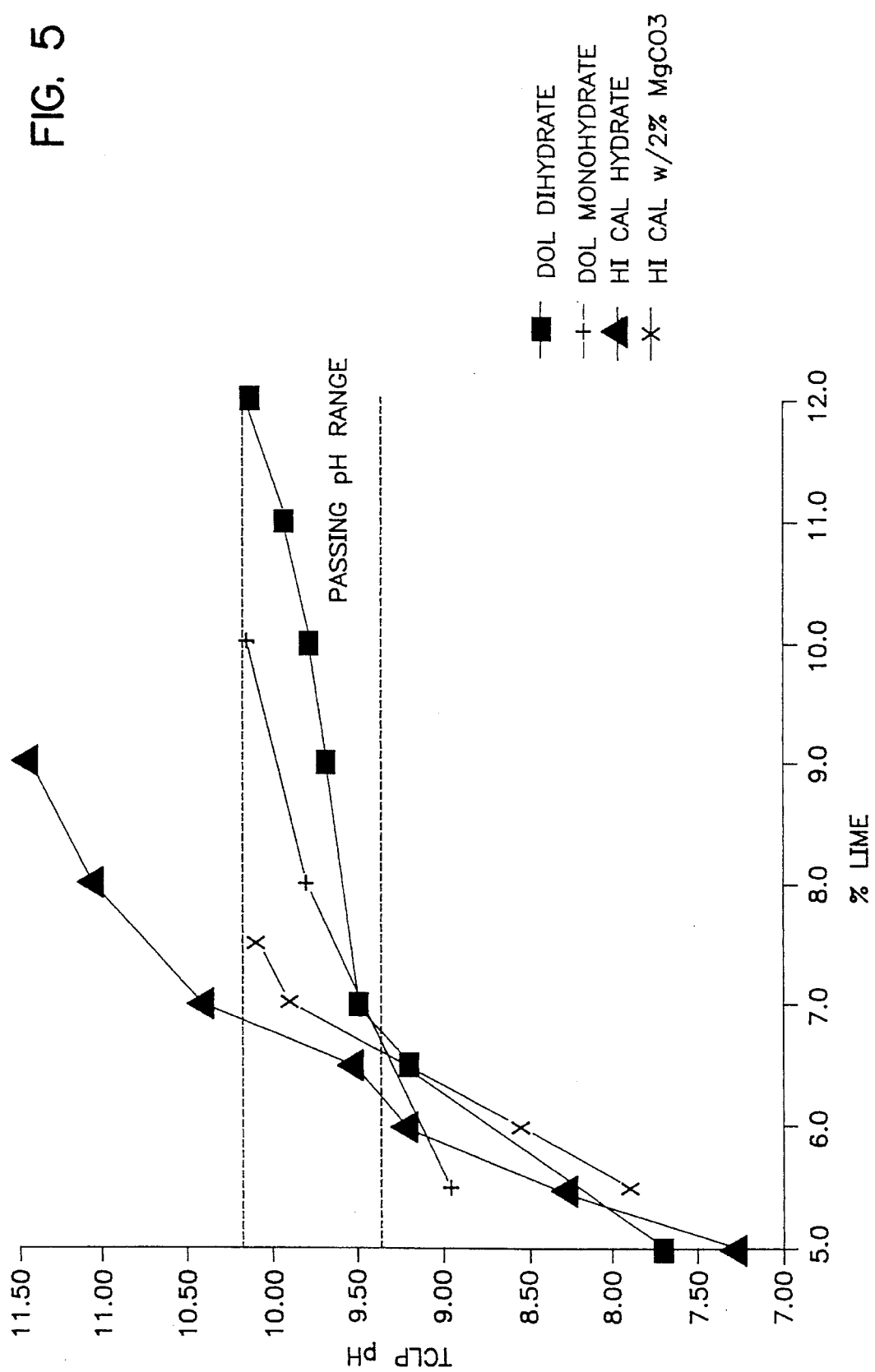

Eighteen EAFD samples, from source "I", were mixed with ferrous sulfate, water, and a buffering agent selected from either dolomitic monohydrated lime, dolomitic dihydrated lime, high-calcium hydrated lime, or high-calcium hydrated lime with 2% magnesium carbonate. The EAFD from source "I" contains approximately 0.3% total available lime in the form of calcium oxide. FIG. 5 and Table L show the available lime added.

TABLE L

| | Mix No.: | | | | |
|---|---|---|---|---|---|
| | 1 | 8 | 6 | 7 | 9 |
| Lime Type: | 2 | 2 | 2 | 2 | 2 |
| EAFD % | 72.0 | 70.5 | 70.0 | 68.0 | 67.0 |
| Lime % | 5.0 | 6.5 | 7.0 | 9.0 | 10.0 |
| FeSO4 Soln. % | 10.0 | 10.0 | 10.0 | 10.0 | 10.0 |
| H2O % | 13.0 | 13.0 | 13.0 | 13.0 | 13.0 |
| TCLP pH: | 7.90 | 9.20 | 9.50 | 9.70 | 9.80 |

| | Mix No.: | | | | |
|---|---|---|---|---|---|
| | 10 | 11 | 12 | 13 | 14 |
| Lime Type: | 2 | 2 | 1 | 1 | 1 |
| EAFD % | 66.0 | 65.0 | 71.5 | 69.0 | 67.0 |
| Lime % | 11.0 | 12.0 | 5.5 | 8.0 | 10.0 |
| FeSO4 Soln. % | 10.0 | 10.0 | 10.0 | 10.0 | 10.0 |
| H2O % | 13.0 | 13.0 | 13.0 | 13.0 | 13.0 |
| TCLP pH: | 9.95 | 10.15 | 8.95 | 9.80 | 10.15 |

REPUBLIC STEEL EAFD

| | Mix No.: | | | | | | | |
|---|---|---|---|---|---|---|---|---|
| | 18 | 19 | 20 | 21 | 22 | 23 | 15 | 16 |
| Lime Type: | 3 | 3 | 3 | 3 | 3 | 3 | 3 | 3 |
| EAFD % | 72.5 | 72.0 | 71.5 | 71.0 | 70.5 | 70.0 | 69.0 | 68.0 |
| Lime % | 4.5 | 5.0 | 5.5 | 6.0 | 6.5 | 7.0 | 8.0 | 9.0 |
| FeSO4 Soln. % | 10.0 | 10.0 | 10.0 | 10.0 | 10.0 | 10.0 | 10.0 | 10.0 |
| H2O % | 13.0 | 13.0 | 13.0 | 13.0 | 13.0 | 13.0 | 13.0 | 13.0 |
| TCLP pH: | 7.15 | 7.30 | 8.30 | 9.25 | 9.55 | 10.45 | 11.10 | 11.50 |

LIME TYPE:
1 = Dolomitic Monohydrate
2 = Dolomitic Dihydrate
3 = Hi Cal Hydrate

Table M below shows the amount of total available lime for each sample (i.e., available lime inherent in the EAFD plus available lime added) and magnesium oxide equivalents for each sample:

TABLE M

| Sample No. | Total Available Lime (wet weight basis) | MgO Equiv. (wet weight basis) |
|---|---|---|
| 1 | 3.86 | 1.52 |
| 6 | 5.31 | 2.14 |
| 7 | 6.75 | 2.74 |
| 8 | 4.94 | 1.98 |
| 9 | 7.48 | 3.05 |
| 10 | 8.21 | 3.36 |
| 11 | 8.94 | 3.66 |
| 12 | 4.85 | 1.94 |
| 13 | 6.95 | 2.82 |
| 14 | 8.63 | 3.53 |
| 15 | 6.27 | 0 |
| 16 | 7.01 | 0 |
| 18 | 3.63 | 0 |
| 19 | 4.00 | 0 |
| 20 | 4.37 | 0 |
| 21 | 4.75 | 0 |
| 22 | 5.13 | 0 |
| 23 | 5.51 | 0 |

The samples were subjected to sixteen hours of agitation, while exposed to an acetic acid solution, in accordance with the TCLP. The final TCLP pH was then measured. Table L shows the compositions of each sample, as well as the final TCLP pH. The final TCLP pH versus percent lime added (wet weight basis) is graphed in FIG. 5.

As shown by FIG. 5, with the selected lime being dolomitic monohydrated lime, the pH is maintained within the optimum range (9.4 to 10.2) over a formulation variance of about 3.0% dolomitic monohydrated lime. In addition, the pH value is maintained within the optimum range when dolomitic dihydrated lime is selected for a formulation variance of over 5.0% dolomitic dihydrated lime. The pH value is maintained within the optimum range when the concentration of magnesium oxide equivalents is 2.14–3.66%. On the other hand, when high calcium hydrated lime is chosen, the composition stays in the desired range for a formulation variance of less than 1.0% high calcium hydrated lime. Also, when high calcium hydrated lime with 2% magnesium carbonate is chosen, the composition stays in the desired range for a formulation variance of about 1.0% high calcium hydrated lime. Thus, dolomitic monohydrated lime and dolomitic dihydrated lime serve as buffering agents for EAFD from source I to maintain the pH value within the optimum range.

EXAMPLE 6

Figure 6:
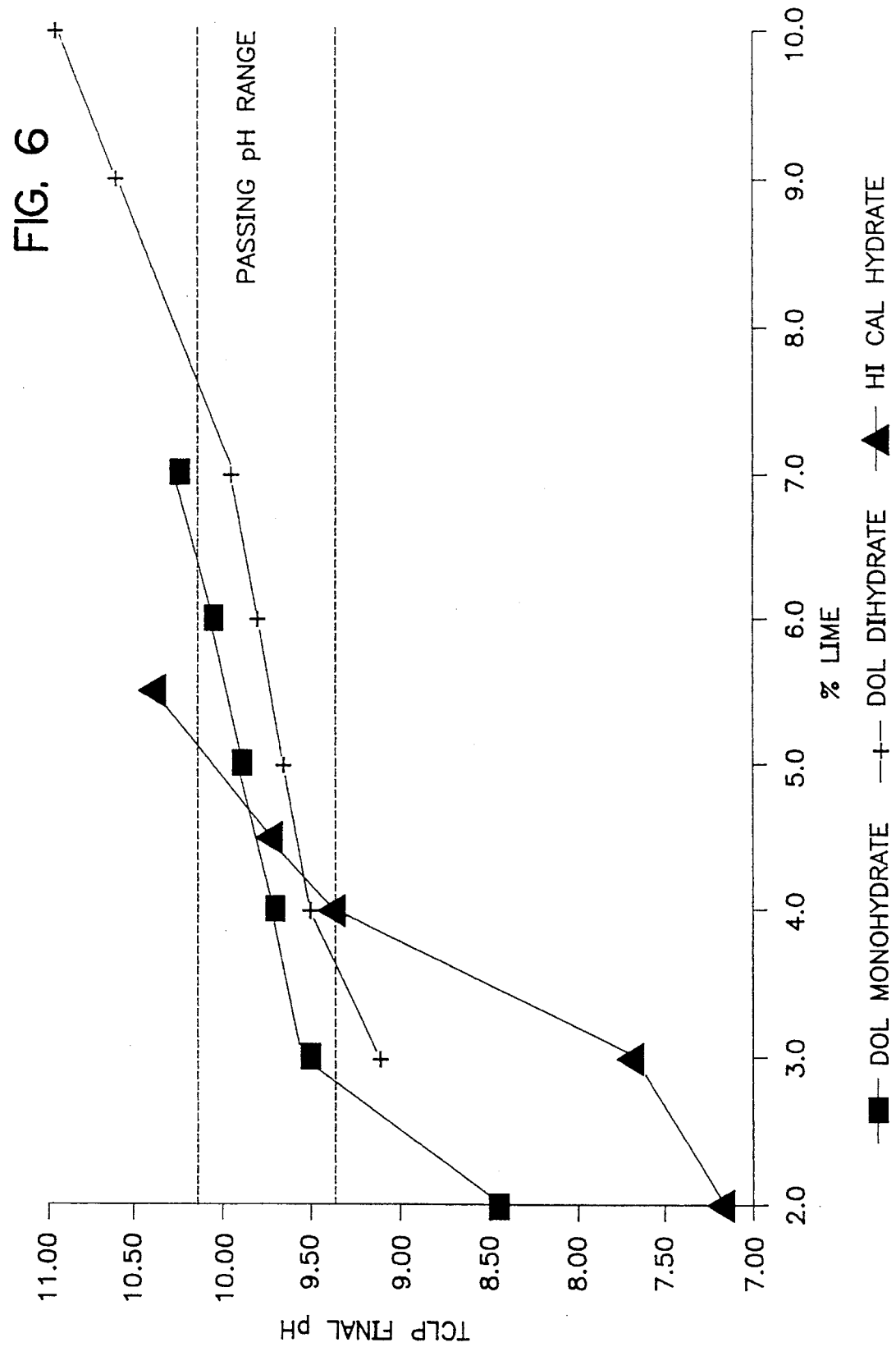

Eighteen EAFD samples, from source "J", were mixed with ferrous sulfate, water, and a buffering agent selected from either dolomitic monohydrated lime, dolomitic dihydrated lime or high-calcium hydrated lime. The EAFD from source "J" contains approximately 2.65% total available lime in the form of calcium oxide. FIG. 6 and Table N show the available lime added.

TABLE N

|  | MIX DESIGN: | | | | | |
| --- | --- | --- | --- | --- | --- | --- |
|  | 1 | 2 | 3 | 7 | 8 | 9 |
| LIME TYPE* | 2 | 2 | 2 | 2 | 2 | 2 |
| EAFD % | 72.0 | 71.0 | 70.0 | 74.0 | 73.0 | 68.0 |
| LIME % | 5.0 | 6.0 | 7.0 | 3.0 | 4.0 | 9.0 |
| FeSO4 SOLN. % | 10.0 | 10.0 | 10.0 | 10.0 | 10.0 | 10.0 |
| WATER % | 13.0 | 13.0 | 13.0 | 13.0 | 13.0 | 13.0 |
| FINAL TCLP pH | 9.65 | 9.80 | 9.95 | 9.10 | 9.50 | 10.60 |

|  | MIX DESIGN: | | | | | |
| --- | --- | --- | --- | --- | --- | --- |
|  | 10 | 4 | 5 | 6 | 11 | 12 |
| LIME TYPE* | 2 | 1 | 1 | 1 | 1 | 1 |
| EAFD % | 67.0 | 72.0 | 71.0 | 70.0 | 75.0 | 74.0 |
| LIME % | 10.0 | 5.0 | 6.0 | 7.0 | 2.0 | 3.0 |
| FeSO4 SOLN. % | 10.0 | 10.0 | 10.0 | 10.0 | 10.0 | 10.0 |
| WATER % | 13.0 | 13.0 | 13.0 | 13.0 | 13.0 | 13.0 |
| FINAL TCLP pH | 10.95 | 9.90 | 10.05 | 10.25 | 8.45 | 9.50 |

|  | MIX DESIGN: | | | | | |
| --- | --- | --- | --- | --- | --- | --- |
|  | 13 | 14 | 15 | 16 | 17 | 18 |
| LIME TYPE* | 1 | 3 | 3 | 3 | 3 | 3 |
| EAFD % | 73.0 | 75.0 | 74.0 | 73.0 | 72.5 | 71.5 |
| LIME % | 4.0 | 2.0 | 3.0 | 4.0 | 4.5 | 5.5 |
| FeSO4 SOLN. % | 10.0 | 10.0 | 10.0 | 10.0 | 10.0 | 10.0 |
| WATER % | 13.0 | 13.0 | 13.0 | 13.0 | 13.0 | 13.0 |
| FINAL TCLP pH | 9.70 | 7.20 | 7.70 | 9.40 | 9.75 | 10.40 |

*1 = Monohydrated lime.
2 = Dihydrated lime
3 = Hi Cal Hydrated Lime

Table O below shows the amount of total available lime for each sample (i.e., available lime inherent in the EAFD plus available lime added) and magnesium oxide equivalents for each sample:

TABLE O

| Sample No. | Total Available Lime (wet weight basis) | MgO Equiv. (wet weight basis) |
| --- | --- | --- |
| 1 | 5.55 | 1.52 |
| 2 | 6.25 | 1.83 |
| 3 | 6.96 | 2.14 |
| 4 | 6.13 | 1.76 |
| 5 | 6.94 | 2.12 |
| 6 | 7.76 | 2.47 |
| 7 | 4.14 | 0.92 |
| 8 | 4.84 | 1.22 |
| 9 | 8.35 | 2.74 |
| 10 | 9.06 | 3.05 |
| 11 | 3.68 | 0.71 |
| 12 | 4.49 | 1.06 |
| 13 | 5.30 | 1.41 |
| 14 | 3.50 | 0 |
| 15 | 4.23 | 0 |
| 16 | 4.96 | 0 |
| 17 | 5.33 | 0 |
| 18 | 6.05 | 0 |

The samples were subjected to sixteen hours of agitation, while exposed to an acetic acid solution, in accordance with the TCLP. The final TCLP pH was then measured. Table N shows the compositions of each sample, as well as the final TCLP pH. The final TCLP pH versus percent lime added (wet weight basis) is graphed in FIG. 6.

As shown by FIG. 6, with the selected lime being dolomitic monohydrated lime, the pH is maintained within the optimum range (9.4 to 10.2) over a formulation variance of over 3.5% dolomitic monohydrated lime. In addition, the pH value is maintained within the optimum range when dolomitic dihydrated lime is selected for a formulation variance of approximately 4.0% dolomitic dihydrated lime. The pH value is maintained within the optimum range when the concentration of magnesium oxide equivalents is 1.06–2.14%. On the other hand, when high calcium hydrated lime is chosen, the composition stays in the desired range for a formulation variance of only approximately 1.2% high calcium hydrated lime. Thus, dolomitic monohydrated lime and dolomitic dihydrated lime serve as buffering agents for EAFD from source J to maintain the pH value within the optimum range.

EXAMPLE 7

Sixteen EAFD samples, from source "H", were mixed with ferrous sulfate, water, and a high-calcium hydrated lime along with varying amounts of magnesium carbonate. The samples were subjected to sixteen hours of agitation, while exposed to an acetic acid solution, in accordance with the TCLP. The final TCLP pH was then measured. Table P shows the compositions of each sample, as well as the final TCLP pH. The final TCLP pH versus percent magnesium carbonate added (wet weight basis) is graphed in FIG. 7.

TABLE P

|  | MIX 14 | MIX 15 | MIX 32 | MIX 16 |
| --- | --- | --- | --- | --- |
| EAFD % | 64.5 | 64.5 | 64.5 | 64.0 |
| HYD. LIME % | 7.5 | 7.5 | 7.5 | 8.0 |
| FeSO4 SOLN. % | 10.0 | 10.0 | 10.0 | 10.0 |
| WATER % | 18.0 | 18.0 | 18.0 | 18.0 |
| MgCO3 %* | 1.0 | 2.0 | 2.5 | 1.0 |
| % MIX SOLIDS | 75 | 75 | 75 | 75 |
| FINAL TCLP pH | 7.40 | 8.95 | 9.35 | 9.80 |
| (UNBUFFERED pH) | 8.85 | 8.85 | 8.85 | 10.25 |

|  | MIX 17 | MIX 18 | MIX 19 | MIX 20 |
| --- | --- | --- | --- | --- |
| EAFD % | 64.0 | 69.0 | 69.0 | 65.0 |
| HYD. LIME % | 8.0 | 8.5 | 8.5 | 7.0 |
| FeSO4 SOLN. % | 10.0 | 10.0 | 10.0 | 10.0 |
| WATER % | 18.0 | 12.5 | 12.5 | 18.0 |
| MgCO3 %* | 2.0 | 1.0 | 2.0 | 1.0 |
| % MIX SOLIDS | 75 | 80 | 80 | 75 |
| FINAL TCLP pH | 9.70 | 10.05 | 9.95 | 8.00 |
| (UNBUFFERED pH) | 10.25 | 10.90 | 10.90 | 7.50 |

|  | MIX 21 | MIX 23 | MIX 24 | MIX 29 |
| --- | --- | --- | --- | --- |
| EAFD % | 65.0 | 64.25 | 64.25 | 64.25 |
| HYD. LIME % | 7.0 | 7.75 | 7.75 | 7.75 |
| FeSO4 SOLN. % | 10.0 | 10.0 | 10.0 | 10.0 |
| WATER % | 18.0 | 18.0 | 18.0 | 18.0 |
| MgCO3 %* | 2.0 | 1.0 | 2.0 | 2.5 |
| % MIX SOLIDS | 75 | 75 | 75 | 75 |
| FINAL TCLP pH | 8.25 | 9.40 | 9.45 | 9.55 |
| (UNBUFFERED pH) | 7.50 | — | — | — |

|  | MIX 25 | MIX 26 | MIX 27 | MIX 30 |
| --- | --- | --- | --- | --- |
| EAFD % | 63.25 | 63.25 | 63.0 | 63.0 |
| HYD. LIME % | 8.75 | 8.75 | 9.00 | 9.00 |
| FeSO4 SOLN. % | 10.0 | 10.0 | 10.0 | 10.0 |
| WATER % | 18.0 | 18.0 | 18.0 | 18.0 |
| MgCO3 %* | 1.0 | 2.0 | 2.0 | 2.5 |
| % MIX SOLIDS | 75 | 75 | 75 | 75 |
| FINAL TCLP pH | 10.70 | 10.10 | 10.30 | 10.15 |
| (UNBUFFERED pH) | — | — | — | — |

*As percent of EAFD.

Table Q below shows the amount of total available lime for each sample (i.e., available lime inherent in the EAFD plus available lime added) and magnesium oxide equivalents for each sample:

TABLE Q

| Sample No. | Total Available Lime (wet weight basis) | MgO Equiv. (wet weight basis) |
|---|---|---|
| 14 | 6.35 | 0.48 |
| 15 | 6.83 | 0.96 |
| 16 | 6.73 | 0.48 |
| 17 | 7.21 | 0.96 |
| 18 | 7.12 | 0.48 |
| 19 | 7.60 | 0.96 |
| 20 | 5.98 | 0.48 |
| 21 | 6.46 | 0.96 |
| 23 | 6.54 | 0.48 |
| 24 | 7.02 | 0.96 |
| 25 | 7.29 | 0.48 |
| 26 | 7.77 | 0.96 |
| 27 | 7.96 | 0.96 |
| 29 | 7.26 | 1.20 |
| 30 | 8.20 | 1.20 |
| 32 | 6.34 | 1.20 |

Figure 7:
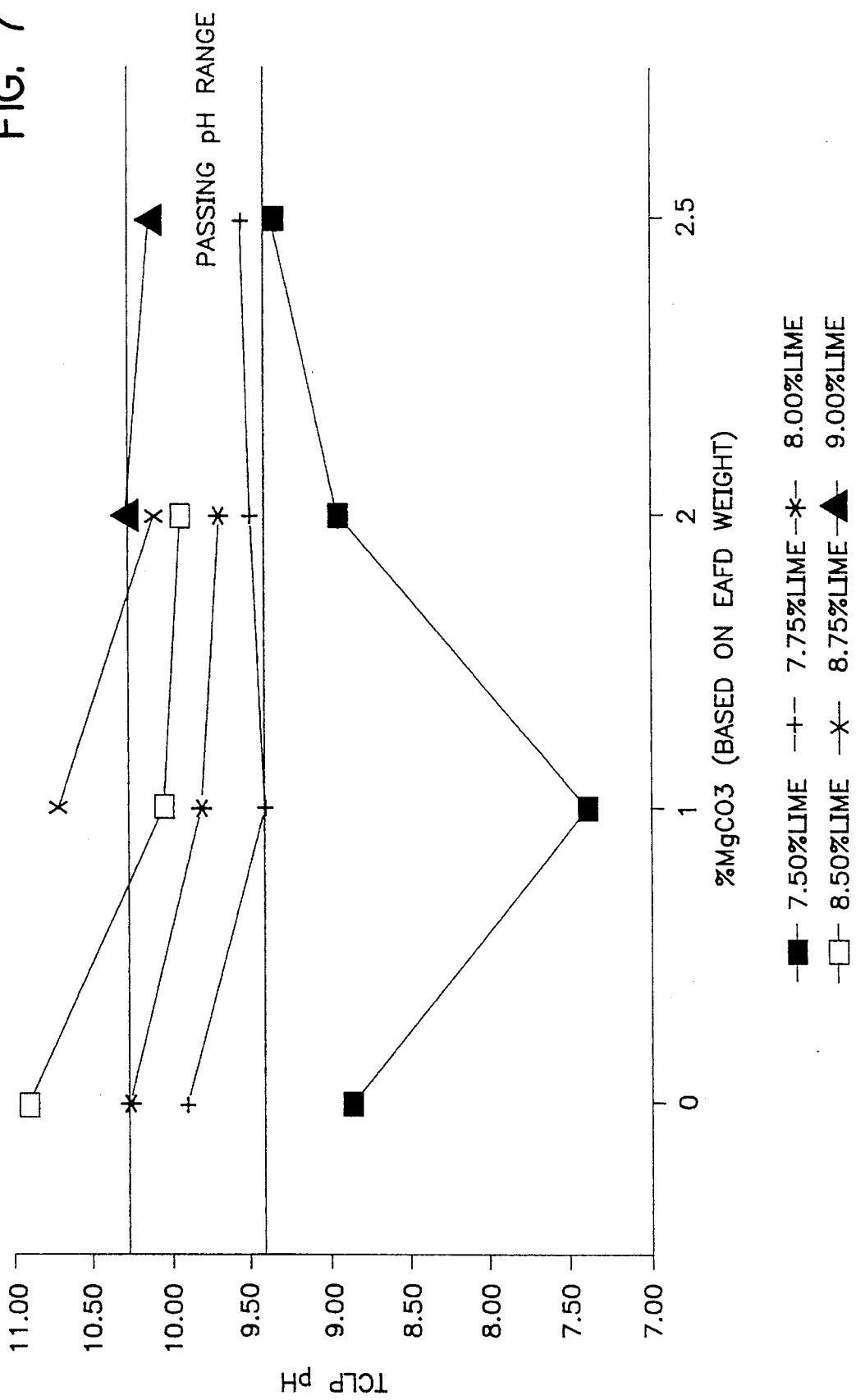
FIG. 7 is a graph of TCLP final pH versus magnesium carbonate added for hazardous waste compositions containing EAFD.

As shown by FIG. 7, with no magnesium carbonate added, the composition is maintained in the desired pH range over a formulation variance of only 0.25% lime added. As the amount of magnesium carbonate increases, the formulation variance of lime added, over which the composition is maintained in the desired pH range, also increases. With 2.5% magnesium carbonate added (i.e. 0.48–1.20% magnesium oxide equivalents), the composition is maintained in the desired pH range over a formulation variance of about 1.5% lime added.

Although illustrated and described herein with reference to certain specific embodiments and examples, the claims which follow are not intended to be limited to the details of the specific embodiments and examples. Rather, the claims should be construed to encompass the invention in its entirety, notwithstanding such variations and modifications therein which may be made by those skilled in the art without departing from the spirit of the invention.

What is claimed:

1. A buffered hazardous waste composition comprising EAFD, sufficient water to react with said EAFD and dolomitic lime in an amount sufficient to: (a) achieve a magnesium oxide equivalents concentration in said waste composition of at least 0.5%, measured on a wet weight basis and (b) maintain said waste composition within a pH range of 8.5–11.5 which reduces heavy metal ion solubility in water after acid exposure.

2. A buffered hazardous waste composition in accordance with claim 1, wherein said dolomitic lime is added in an amount sufficient to achieve a magnesium oxide equivalents concentration in said waste composition of 0.5–3.0%, measured on a wet weight basis.

3. A buffered hazardous waste composition in accordance with claim 1 having a pH of from 9.4–10.2.

4. A buffered hazardous waste composition in accordance with claim 1, further comprising ferrous sulfate in an amount of 1–30%, measured on a wet weight basis.

5. A buffered hazardous waste composition in accordance with claim 1, further comprising ferrous sulfate in an amount of about 3%, measured on a wet weight basis.

6. A buffered hazardous waste composition in accordance with claim 1, wherein said dolomitic lime is added in an amount sufficient to achieve a total available lime concentration of at least 5.5%, measured on a wet weight basis.

7. A buffered hazardous waste composition in accordance with claim 6, wherein said dolomitic lime is added in an amount sufficient to achieve a total available lime concentration of about 5.5–6.5%, measured on a wet weight basis.

8. A buffered hazardous waste composition in accordance with claim 4 having a pH of from 9.4–10.2.

9. A buffered hazardous waste composition in accordance with claim 1, wherein said dolomitic lime is dolomitic hydrated lime.

10. A buffered hazardous waste composition in accordance with claim 9, wherein said dolomitic hydrated lime is dolomitic monohydrated lime.

11. A buffered hazardous waste composition in accordance with claim 9, wherein said dolomitic hydrated lime is dolomitic dihydrated lime.

12. A buffered hazardous waste composition in accordance with claim 1, wherein said dolomitic lime is dolomitic quicklime.

13. A buffered hazardous waste composition in accordance with claim 1, wherein said composition comprises 63%–76% EAFD, measured on a wet weight basis.

14. A method of treating a hazardous waste composition, comprising EAFD and water, to reduce heavy metal ion solubility in water, said method comprising the steps of:
  (a) determining if said waste composition has a total available lime concentration in said waste composition above 4.0% measured on a wet weight basis, and if:
    (i) said waste composition does have a total available lime concentration in said waste composition above 4.0% measured on a wet weight basis, then adding to said waste composition a neutralizing agent in an amount sufficient to reduce said total available lime concentration to a maximum of 4.0%, measured on a wet weight basis, and
    (ii) said waste composition does not have a total available lime concentration in said waste composition above 4.0% measured on a wet weight basis, then proceeding directly to step (b), and
  (b) adding dolomitic lime to said waste composition in an amount sufficient to achieve a magnesium oxide equivalents concentration in said waste composition of at least 0.5%, measured on a wet weight basis,
to produce a pH of 8.5–11.5.

15. A method in accordance with claim 14, wherein:
  the step adding a neutralizing agent is done if total available lime concentration in said waste composition exceeds 2.0%, measured on a wet weight basis;
  the neutralizing agent is added to reduce the total available lime concentration to 2.0%, measured on a wet weight basis; and
  dolomitic lime is added to achieve a magnesium oxide equivalents concentration in said waste composition of 1.0–3.0%, measured on a wet weight basis.

16. A method in accordance with claim 14, wherein the pH produced is from 9.4–10.2.

17. A method in accordance with claim 14, wherein said neutralizing agent is ferrous sulfate which is added to achieve a concentration of from 1–30%, measured on a wet weight basis.

18. A method in accordance with claim 14, wherein said neutralizing agent is ferrous sulfate which is added to achieve a concentration of about 3%, measured on a wet weight basis.

19. A method in accordance with claim 14, wherein the step of adding dolomitic lime includes adding dolomitic lime in an amount sufficient to achieve a total available lime concentration of at least 5.5% measured on a wet weight basis.

20. A method in accordance with claim 19, wherein the pH produced is from 9.4–10.2.

21. A method in accordance with claim 14, wherein said dolomitic lime is dolomitic hydrated lime.

22. A method in accordance with claim 21, wherein said dolomitic hydrated lime is dolomitic monohydrated lime.

23. A method in accordance with claim 21, wherein said dolomitic hydrated lime is dolomitic dihydrated lime.

24. A method in accordance with claim 14, wherein said dolomitic lime is dolomitic quicklime.

25. A method in accordance with claim 14, further comprising the step of permitting the hazardous waste composition comprising EAFD and water, with dolomitic lime included therein, to react to form a cementitiously hardened product.

26. A method in accordance with claim 14, wherein said neutralizing agent is carbon dioxide.

27. A method in accordance with claim 14, wherein dolomitic lime is added to achieve a magnesium oxide equivalents concentration in said waste composition of 0.5–1.0%, measured on a wet weight basis.

28. In a method of stabilizing a hazardous waste containing EAFD including forming a mixture of EAFD and water, the improvement comprising including in said mixture a buffering agent comprising dolomitic lime.

* * * * *

UNITED STATES PATENT AND TRADE MARK OFFICE
CERTIFICATE OF CORRECTION

PATENT NO. :  5,569,152
DATED       :  October 29, 1996
INVENTOR(S) :  Charles L. Smith It is certified that error appears in the above-identified patent and that said Letters Patent is hereby corrected as shown below:

At column 20, line 41, after "step", insert --of--.

Signed and Sealed this

Sixth Day of May, 1997

Attest:

BRUCE LEHMAN

Attesting Officer

Commissioner of Patents and Trademarks